(12) United States Patent
Kubala (10) Patent No.: US 7,343,968 B2
(45) Date of Patent: Mar. 18, 2008

(54) WASHPIPE SEAL ASSEMBLY

(75) Inventor: Zbigniew Kubala, Beach Park, IL (US)

(73) Assignee: Deublin Company, Waukegan, IL (US)

( * ) Notice: Subject to any disclaimer, the term of this patent is extended or adjusted under 35 U.S.C. 154(b) by 246 days.

(21) Appl. No.: 11/211,384

(22) Filed: Aug. 24, 2005

(65) Prior Publication Data

US 2006/0042789 A1 Mar. 2, 2006

Related U.S. Application Data

(60) Provisional application No. 60/604,944, filed on Aug. 27, 2004.

(51) Int. Cl.
*E21B 33/02* (2006.01)
*F16J 15/34* (2006.01)

(52) U.S. Cl. ............... 166/75.11; 166/84.1; 277/327; 277/369; 277/405; 285/279

(58) Field of Classification Search ............ 166/88.4, 166/84.1, 75.11; 285/275, 279; 277/322, 277/326, 327, 358, 362, 363, 369, 377, 405

See application file for complete search history.

(56) References Cited

U.S. PATENT DOCUMENTS

| 1,930,833 A | 10/1933 | Barrett |
|---|---|---|
| 2,305,725 A | 12/1942 | Meyer |
| 2,331,615 A | 10/1943 | Meyer |
| 3,058,761 A | 10/1962 | Christophersen |
| 3,547,452 A | 12/1970 | Hirata |
| 3,624,809 A | 11/1971 | Beninga |
| 3,649,056 A | 3/1972 | Frohlich et al. |
| 3,746,350 A | 7/1973 | Mayer et al. |
| 3,782,735 A | 1/1974 | Novosad |
| 3,889,983 A * | 6/1975 | Freize et al. ................. 285/13 |
| 3,921,986 A | 11/1975 | Geary et al. |
| 3,948,533 A | 4/1976 | Novosad |
| 4,071,253 A | 1/1978 | Heinen et al. |
| 4,261,581 A | 4/1981 | Hershey |
| 4,266,786 A | 5/1981 | Wiese |
| 4,272,084 A | 6/1981 | Martinson et al. |
| 4,299,398 A | 11/1981 | Wahl |
| 4,314,704 A | 2/1982 | Wichall |
| 4,391,450 A | 7/1983 | Beck |
| 4,418,919 A | 12/1983 | Wentworth |
| 4,425,699 A | 1/1984 | Nordin |

(Continued)

FOREIGN PATENT DOCUMENTS

EP    1630347 A1 *    1/2006

OTHER PUBLICATIONS

Anonymous, PerkinElmer promotional material, date uncertain (believed to be late 2004-2005).

*Primary Examiner*—Kenneth Thompson
(74) *Attorney, Agent, or Firm*—Leydig, Voit & Mayer, Ltd (57) ABSTRACT

A coupling seal assembly is described for directing a pressurized abrasive fluid between a non-rotating conduit member and a rotating second conduit member. The seal assembly includes a first ceramic floating seal member secured to the non-rotating conduit member and a second ceramic seal member secured to the rotating conduit member. Enhanced service life of the seal assembly under high pressures and high rotary speeds is achieved.

24 Claims, 5 Drawing Sheets

U.S. PATENT DOCUMENTS

| | | |
|---|---|---|
| 4,436,315 A | 3/1984 | Hatch et al. |
| 4,557,489 A * | 12/1985 | Wentworth ............... 277/322 |
| 4,613,142 A | 9/1986 | Heilala |
| 4,632,431 A | 12/1986 | McCracken |
| 4,659,092 A | 4/1987 | Wallace et al. |
| 4,700,953 A | 10/1987 | Kuusela et al. |
| RE32,646 E | 4/1988 | Wentworth |
| 4,773,655 A | 9/1988 | Lummila et al. |
| 4,779,876 A | 10/1988 | Novosad |
| 4,842,286 A | 6/1989 | Heilala |
| 4,890,851 A | 1/1990 | Avard et al. |
| 5,042,824 A | 8/1991 | Gardner et al. |
| 5,169,181 A * | 12/1992 | Timm et al. ............... 285/276 |
| 5,174,614 A | 12/1992 | Kaleniecki |
| 5,199,720 A | 4/1993 | Radosav et al. |
| 5,577,775 A * | 11/1996 | Pearson et al. ............... 285/24 |
| 6,007,105 A | 12/1999 | Dietle et al. |
| 6,086,069 A | 7/2000 | Bedford |
| 6,244,345 B1 | 6/2001 | Helms |
| 6,412,784 B1 | 7/2002 | Cohen |
| 6,528,168 B1 | 3/2003 | Matsumoto et al. |
| 6,685,194 B2 | 2/2004 | Dietle et al. |
| 6,969,071 B2 | 11/2005 | Berard |
| 7,213,660 B2 * | 5/2007 | Martin ....................... 175/207 |
| 2003/0051883 A1 | 3/2003 | Seneviratne |
| 2007/0267820 A1 * | 11/2007 | Martin ....................... 277/404 |

* cited by examiner

(prior art)

WASHPIPE SEAL ASSEMBLY

CROSS-REFERENCE TO RELATED APPLICATION

This application is related to and claims the benefit of U.S. Provisional Application Ser. No. 60/604,944 filed Aug. 27, 2004, the teachings of which are incorporated herein by reference.

BACKGROUND OF THE INVENTION

The present invention relates to an extended life swivel seal assembly and, in particular, to an extended life swivel seal assembly for use in a fluid coupling device for high speed geological drilling operations.

Fluid coupling devices are utilized in high speed drilling operations where it is necessary to couple the outlet of a fluid source to the rotating device. Specifically, in oil and gas drilling operations, swivel seal assemblies are utilized to provide a sealing arrangement between the washpipe and the rotating sealing housing.

One type of a drilling rig swivel seal assembly utilizes a stack of rotary seals which are typically comprised of reinforced elastomeric material that provide a dynamic sealing arrangement with the external cylindrical sealing surface of the washpipe. In such designs, the seals and their housings rotate relative to the stationary washpipe, and the seals are sequentially exposed to the high pressure drilling fluid on one side of the seal and atmospheric pressure on the other side of the seal. This differential pressure causes the seal closest to the high pressure to grab tightly against the washpipe, thereby causing a high degree of wear and abrasion to the washpipe and the seal. The relatively large clearance required between the rotating seal and the washpipe result in ultimate failure of the seal. Additionally, because of the stacked relation of the seals to the washpipe, once the first seal fails, the next seal in the stack is exposed to similar forces and wear and so on until all the seals have been consumed by the severe abrasive operating conditions. Also, such rotary seal members are complicated and complex in structure, are time consuming and difficult to replace, and have a limited lifetime of approximately 200 hours or less when operating at 90 RPM's and up to 2,500 PSI. When such seal assemblies are operated at 5,000 PSI and at 250 RPM's, such seals last only between 20 and 30 hours before replacement is necessary.

An additional sealing arrangement is the utilization of complex U-shaped cup ring sealing assemblies between the washpipe and the rotating seal assembly. However, such sealing assemblies also have a limited lifetime and require significant replacement costs due to wear and abrasion which results in extended downtime of the drilling swivel seal assembly.

It has also been suggested to provide a floating seal member attached to the rotating coupling member and a similar seal member mounted to the non-rotating coupling member to provide a seal assembly for a drilling rig swivel assembly. Such seal assemblies further include a secondary seal member comprised of a U-cup seal member between the distal end of the washpipe member and the floating seal member. However, because the U-cup seal member is exposed to the high pressure abrasive drilling fluid, such contact results in the rapid failure of such fluid coupling assemblies.

SUMMARY OF THE INVENTION

One object of the present invention is to provide a solution to the limited lifetime of existing sealing assemblies for drilling rig swivel coupling assemblies.

It is another object of the present invention to provide an extended life swivel seal assembly which is mounted to the stationary non-rotating washpipe or coupling member.

It is yet another object of the present invention to provide an improved sealing arrangement for swivel coupling assemblies which provide an extended seal life and which result in reduced wear of the annular seal face members.

Moreover, it is a further object of the present invention to provide first and second annular seal members which are structurally arranged with respect to one another such that at least one of the seal members may be flipped with respect to the other seal member to provide a second operating sealing surface between such annular seal members.

The present invention provides an extended life sealing arrangement for a drilling rig swivel or coupling assembly which utilizes a floating seal assembly having a seal member mounted to the non-rotating washpipe or first conduit member and which is structurally arranged to engage a rotating seal member which is mounted to a second conduit member or the rotating machine to provide a sealing arrangement between the rotating seal member and the floating seal member. The floating seal assembly is detachably mounted to the stationary tubular portion of the swivel coupling device. A tubular floating seal guide member is aligned and attached to the stationary housing with antirotating pins to ensure that the tubular floating seal guide member permits directional fluid flow therethrough. The washpipe extension portion of the seal guide member is structurally arranged with a floating seal member in a male/female relationship. A secondary U-cup seal member is positioned between the floating seal housing member and washpipe extension to prevent penetration of the abrasive containing fluid from the swivel assembly. The floating seal assembly includes a floating seal retracting nut and locating or driving pins thereon to provide a mounting of the stationary or floating sealing ring assembly.

The stationary or floating seal ring assembly is comprised of a first ceramic sealing ring that is mounted within a circular steel ring member by heat shrinking the steel ring member about the ceramic sealing ring member. The floating seal is mounted to the floating guide seal member by locating pins and a floating seal retracting nut. The retracting nut compresses a spring member which adjusts the gap distance between the first sealing ring member and the second sealing ring member which is keyed to an adaptor plate member secured to the rotating second conduit member or machine. The second sealing member is also provided with a ceramic sealing ring that is heat-shrink mounted within a steel ring member.

The cross-section configuration of the second ceramic sealing ring is approximately rectangular or square in shape, with the cross-section of the first silicon carbide seal ring member having a similar shape except that it is preferred that one of the contact wear surfaces of the first ceramic sealing ring have an annular projecting wear surface portion for contacting and engaging the second ceramic sealing ring.

It has been determined that the present invention is operable at pressures of between 5,000 to 10,000 PSI and up to 250 RPM's, with an extended life of up to 500 hours. When excessive abrasion occurs between the first and second ceramic sealing rings, the unique structure of the present invention permits that the second sealing member may be turned over to provide an additional operational sealing surface with the first sealing ring. Thus, the present invention provides a sealing structure for a drilling rig swivel assembly which permits high pressure sealing operations for a period of time of up to 1,000 hours.

Additionally, because the floating seal or first stationary sealing ring is mounted by the non-rotating floating seal guide member to the first conduit member, the rotation of the rotary seal or second rotating ceramic sealing ring with respect to the non-rotating first sealing ring assists in preventing misalignment with respect to these sealing faces, which results in an increased lifetime performance of such swivel seal assemblies. Additionally, because the floating seal assembly is mounted to the non-rotating member with a seal retraction nut, the nut may be readily compressed to move the first ceramic seal ring away from the rotating seal ring member to permit ready access to and change of the units when wear occurs. This ease in changing or replacing the primary sealing arrangement of the first and second seal members with respect to one another is a further and important advantage of the present invention.

A secondary seal arrangement or assembly is provided in the present invention. This secondary seal arrangement includes a U-cup seal member positioned within a seal chamber defined by the outside surface of the floating seal member. The secondary seal arrangement is positioned between the washpipe and floating seal member at a location which is remote from the high pressure abrasive drilling fluid and provides effective sealing between the two members.

The present invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For purpose of facilitating and understanding the present invention, there is illustrated in the accompanying drawings a preferred embodiment thereof from an inspection of which, when considered in conjunction with the following description, the invention, its construction and operation and many of its advantages will be readily understood and appreciated.

DESCRIPTION OF THE PREFERRED EMBODIMENT

Figure 1:
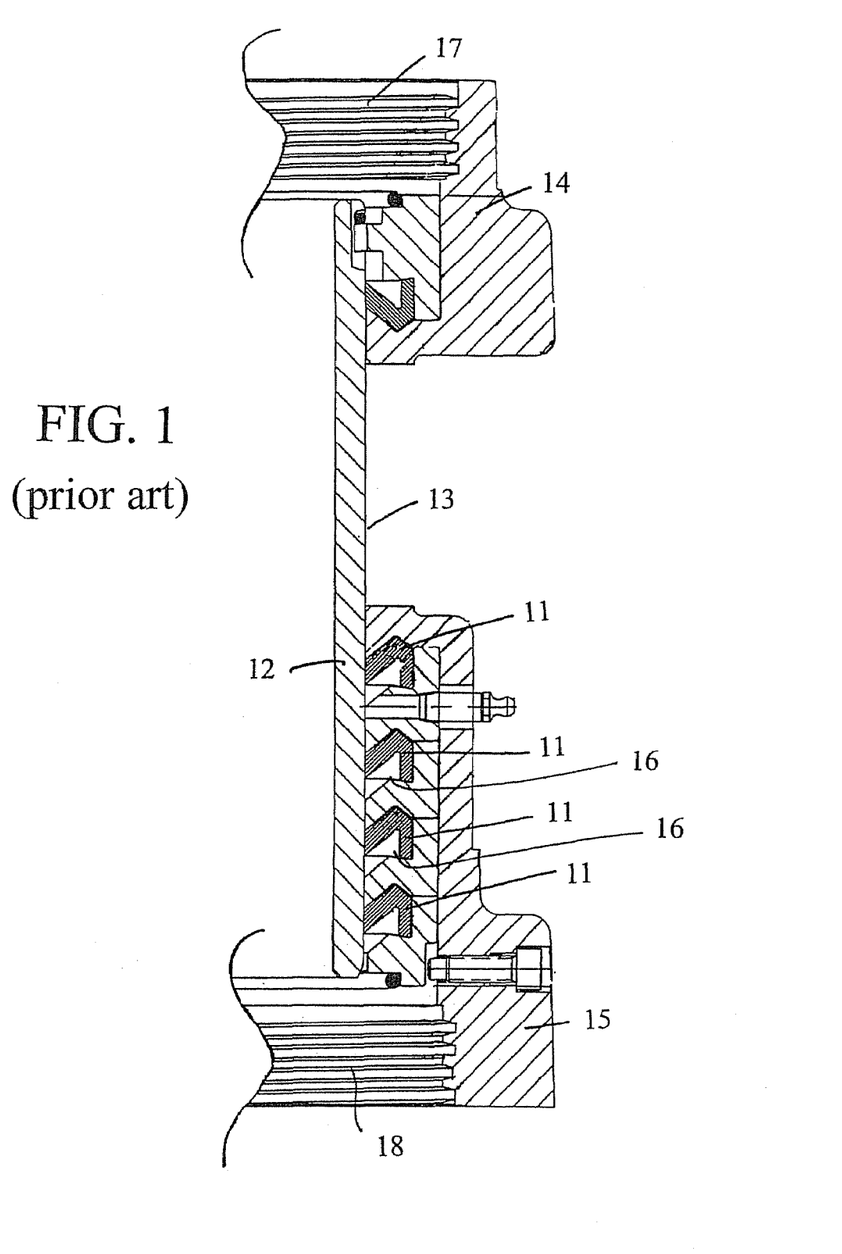
FIG. 1 is a cross-section representative of a prior art stack of hydrodynamic seals associated with drilling rig swivels.

Referring now to the drawings, there is illustrated a preferred embodiment of the present invention which relates to a drilling rig swivel or coupling assembly 10 which incorporates the improved sealing arrangement and assembly provided in accordance with the present invention. A fragmentary portion of a drilling swivel is shown in FIG. 1 and is representative of the prior art wherein a drilling rig swivel seal assembly utilizes a stack of rotary seals 11. The rotary seals 11 are typically comprised of reinforced elastomeric materials that provide a dynamic sealing arrangement with the external cylindrical sealing surface 13 of a washpipe 12. The drilling swivel conducts abrasive drilling fluid from a non-rotating hose or member 14 to a rotating drill string or member 15. As shown in FIG. 1, the rotary seals 11 are located within housing grooves 16 and are compressed against a relatively rotatable washpipe surface 13 to establish a sealing contact therebetween to retain the abrasive drilling fluid within the coupling assembly 10. Excessive clearance between the rotating seal members and the washpipe 12 cause the seal to result in ultimate failure. The reinforced elastomeric rotary seals 11 are stacked about the washpipe 12 and provide sequential exposure to the high pressure drilling fluid on the one side of the seal and the atmospheric pressure on the other side of the seal. This differential pressure causes the rotary seal engaged by the high pressure to tightly grab and engage the washpipe, thereby causing a high degree of wear and abrasion to the washpipe and the seal. When the first rotary seal fails, the next seal in the stack is exposed to similar forces and wear until all of the seals have been destroyed by the abrasion containing drilling fluid.

Figure 2:
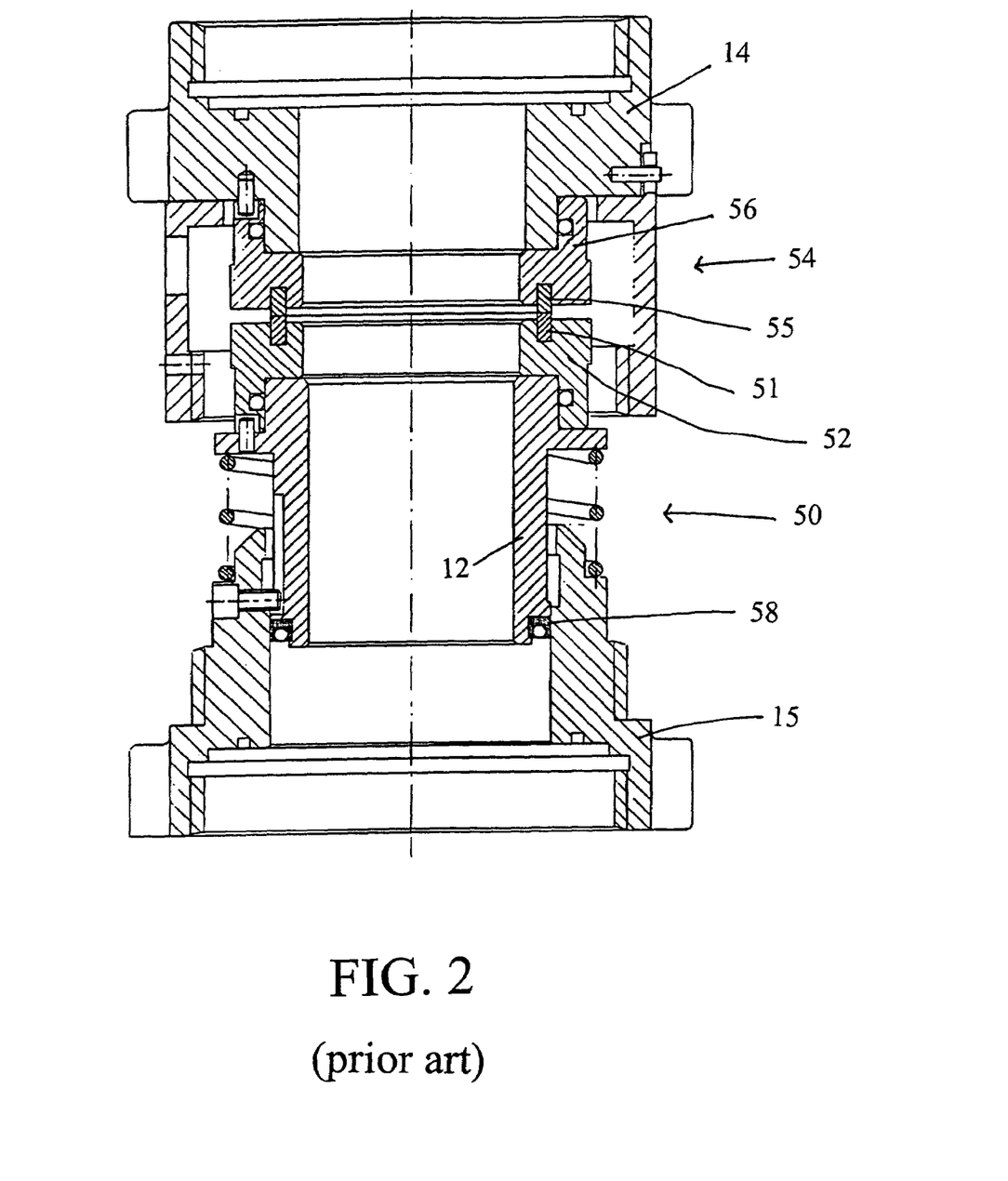
FIG. 2 is a cross-sectional view of a prior art drilling rig swivel assembly.

FIG. 2 is a representation of a prior art drilling rig swivel assembly comprised of a floating seal member mounted to the rotating coupling member and a seal member mounted to the non-rotating coupling member. The floating seal assembly 50 is comprised of a ceramic ring member 51 mounted to a ring holder 52, with the floating seal assembly structurally arranged to engage the stationary seal assembly 54 comprised of a ceramic ring member 55 mounted to a ring holder 56. The prior art swivel assembly includes a secondary seal assembly comprised of an U-cup seal member 58 positioned between the end of the washpipe 12 and the rotating drill string member 15. However, the exposure of the secondary seal arrangement to the abrasive fluid, the positioning of the floating seal member on the rotating coupling member, and the presentment of narrow contact surfaces between the ring members 51 and 55 result in unacceptable lifetimes of such swivel assemblies.

Figure 3:
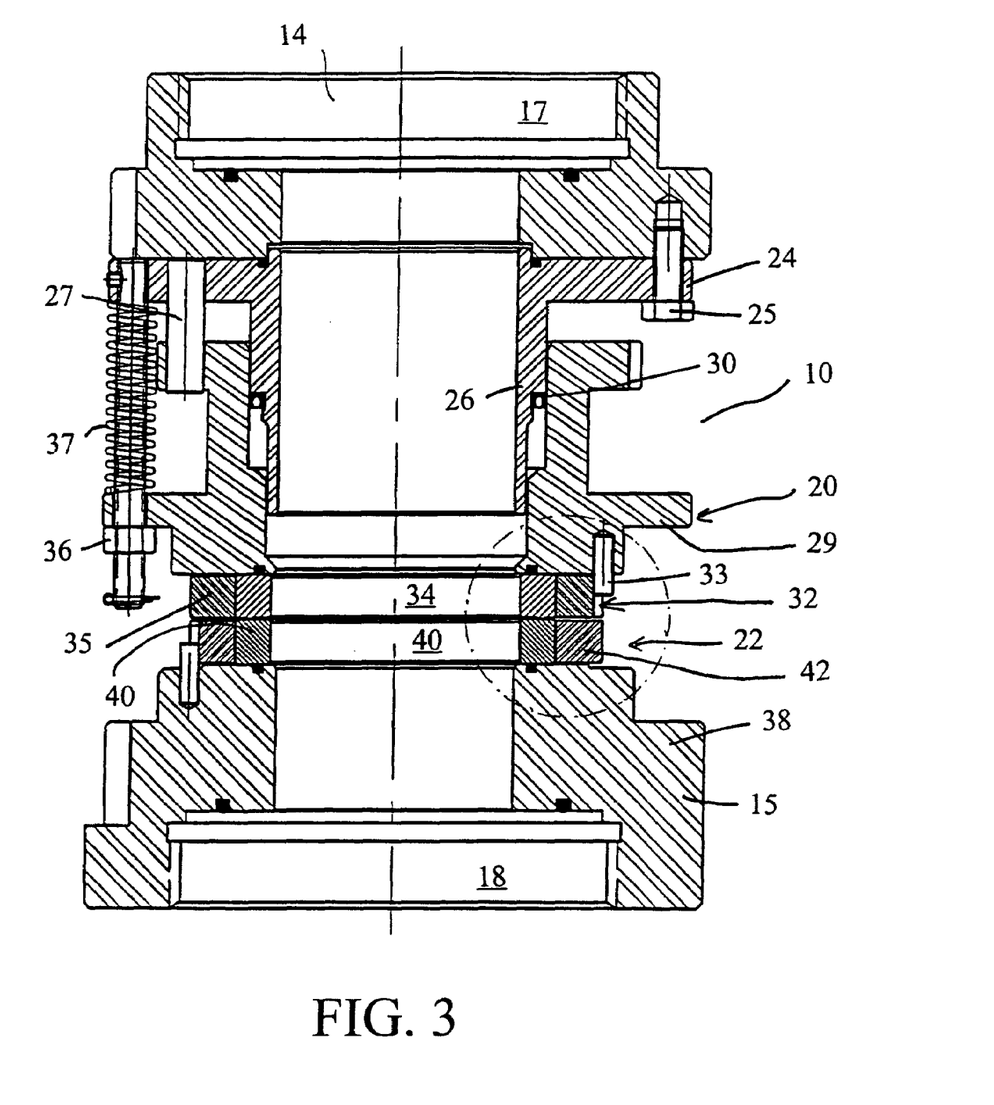
FIG. 3 is a longitudinal, cross-sectional view representing a preferred embodiment of the floating swivel seal assembly in accordance with the present invention wherein the first and second seal assemblies are in engagement and contacting one another to provide the sealing structure.
Figure 4:
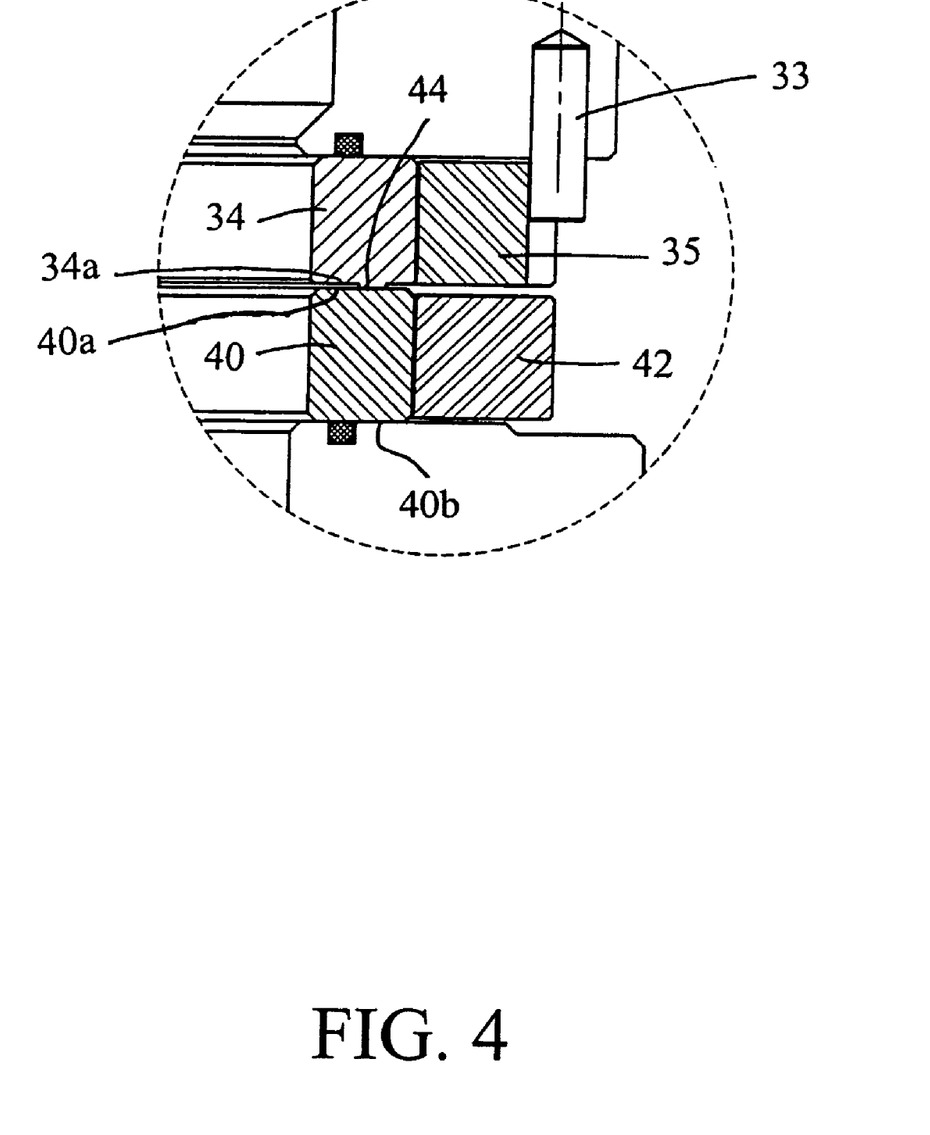
FIG. 4 is an enlarged view of the floating swivel seal assembly shown in the circle in FIG. 3, illustrating the secondary seal arrangement in accordance with the present invention.
Figure 5:
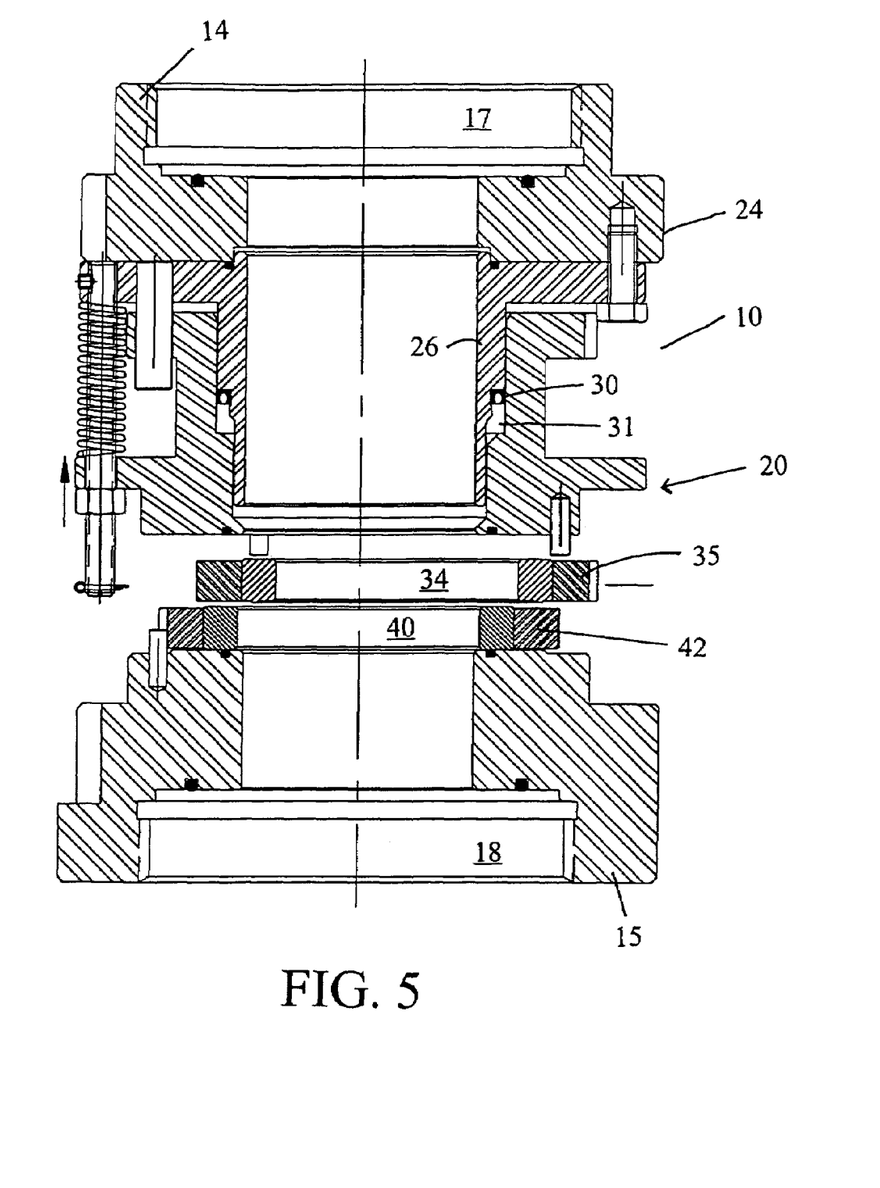
FIG. 5 is a longitudinal, cross-sectional illustration representing the drilling rig swivel floating seal assembly in accordance with the present invention shown in its unoperated, unpressurized condition.

To overcome the deficiencies of a stacked sealing system in accordance with the prior art, the present invention is described with reference to FIGS. 3 and 5. The present invention provides an extended life sealing arrangement for a drilling rig swivel or coupling assembly 10. However, it is within the scope of the present invention that the particular swivel structure that is illustrated in FIGS. 1-5 are not intended to limit the spirit and scope of the present invention. The present invention is applicable to any type of fluid conducting swivel assemblies wherein a second conduit member 18 is positioned coaxially with respect to a first conduit member 17 and wherein the second conduit member is rotatable and is representative of a drill string or similar member 15, and the first conduit member is non-rotatable and is representative of a hose or similar member 14.

The present invention includes a floating seal assembly 20 mounted to the non-rotating first conduit member 17 which is structurally arranged to engage a rotating seal assembly 22 which is mounted to the rotating second conduit member 18 to provide a sealing arrangement between the rotating and floating seal members. A tubular floating seal guide member 24 is aligned with the first conduit member 17 and is coaxially secured thereto by a fastening member 25 and anti-rotation pins 27. The floating seal guide member 24 includes a tubular extension or washpipe member 26, which is structurally arranged to permit drilling fluid to pass therethrough from the first conduit member 17 to the rotating second conduit member 18. The tubular or washpipe member 26 of the seal guide member 24 is structurally arranged to cooperate with a floating seal member 29 in a male-female relationship, with a secondary U-cup seal member 30 positioned between the floating seal member and the tubular washpipe member 26. The U-cup shaped seal member 30 prevents escape of abrasive drilling fluid from the drilling rig swivel or coupling assembly 10.

The floating seal assembly 20 is mounted to the stationary portion of the coupling device or assembly 10 and is aligned to the stationary conduit member 17 with anti-rotation pins 27 to ensure that the floating seal guide member permits directional fluid flow therebetween. The washpipe extension member 26 is surrounded by the floating seal member 29 to define a seal chamber 31 therebetween. The seal chamber 31 includes a secondary U-cup seal ring 30 therebetween to prevent escape of the abrasive containing fluid from the swivel unit during operation.

A floating seal ring assembly 32 is keyed 33 to the floating seal member 29. The floating seal ring assembly 32 is comprised of a first ceramic seal ring member 34 which is mounted within a circular stationary steel ring member 35 by heat shrinking the steel ring member about the first ceramic seal ring member. This floating seal member 29 is mounted to the floating guide member 24 by floating seal retracting nut 36. The retracting nut 36 compresses a spring member 37 which provides a squeeze force between the floating seal ring assembly 32 and the first ceramic seal ring 34, and a second ceramic sealing ring member 40, which is keyed and mounted to an adaptor plate member 38 secured to the rotating or second conduit member 18. The rotating second ceramic seal ring member 40 is also heat shrunk mounted within a steel ring member 42.

The cross-sectional configuration of the first and second ceramic seal ring members 34 and 40, respectively, are approximately rectangular or square in shape with the first ceramic sealing ring 34 having an annular projection 44 (FIG. 4) extending outwardly from the seal surface 34a of the sealing ring. As shown in FIG. 4, the annular projection 44 provides a planar outer surface which enables sealing engagement with the sealing surfaces 40a and 40b of the second annular sealing ring 40. The annular projection 44 has an inside diameter greater than the inside diameter of the second ceramic seal ring and has an outside diameter which is less than the outside diameter of the second ceramic sealing ring.

In operation of the swivel assembly, it has been found that the floating seal assembly of the present invention is operable at pressures of between 5,000 to 10,000 PSI and up to 250 RPM's with an extended life of up to 1,000 hours. When excessive abrasion occurs between the first and second ceramic seal ring members, the present invention permits that sealing ring member 40 may be flipped to present surface 40b to projection 44 of the first seal ring member 34 to provide additional operational sealing surface. Thus, the present invention provides a sealing structure for a coupling assembly which permits high pressure operations for a period of time of up to 500 hours, which operational time may be doubled to at least about 1,000 hours by flipping the first sealing ring to provide additional operational sealing surfaces.

Because the floating seal assembly 20 is mounted to the non-rotating first conduit guide member 17, the stability of the floating seal assembly aids in the avoidance of misalignment of the two sealing assemblies to provide an extended sealing life for the present invention. Also, because the floating seal is mounted by a retracting member 36, the readily compressed spring member 37 permits ready access to the sealing assemblies of the present invention. Thus, the ease in changing or replacing the first and second ceramic/silicon carbide seal ring members is an important advantage of the present invention.

The above description is not intended to limit the present invention, and alternative embodiments will be apparent to those of ordinary skill in the art. Accordingly, the scope of the invention should be determined by the appended claims and their legal equivalents, not by the embodiments described and shown above.

I claim:

1. A swivel assembly for conducting a high pressure fluid, including in combination:
    a non-rotating conduit member having a first end attached to the source of high pressure fluid and having an end opposite said first end,
    a seal guide member structurally secured to said end opposite said first end and aligned with said first end, with said seal guide member having a tubular washpipe extension portion which permits the passage of high pressure fluid therethrough;
    a tubular floating seal member telescopically mounted about said tubular washpipe extension portion and providing a seal chamber therebetween, with said tubular floating seal member, having a distal end, being adjustably secured to said non-rotating conduit member by a biasing member;
    a first seal ring member structurally secured to and aligned with said tubular floating seal member on said distal end thereof;
    a rotating conduit member having a proximal end aligned with respect to said distal end of said tubular floating seal member; and
    a second seal ring member structurally secured to said proximal end of said rotating conduit member, with said first and said second seal ring members providing a sealing force therebetween due to said biasing member when a high pressure fluid is conducted through the swivel assembly.

2. The swivel assembly in accordance with claim 1, wherein each of said first and said second ring members is comprised of a ceramic material and is substantially rectangular in cross-section, with at least one of said first or said second ring members having first and second sealing wear surfaces thereon.

3. The swivel assembly in accordance with claim 2, wherein each of said first and said second ring members are securely mounted about the external diameter within a steel ring holder member to maintain a symmetrical structure for said wear surfaces while having a flatness for said wear surfaces.

4. The swivel assembly in accordance with claim 3, wherein each of said first and said second ring members are mounted within said steel ring holder members by heat shrinking said steel ring holder member about said respective ring member.

5. The swivel assembly in accordance with claim 2, wherein at least one of said first or said second ring member is said second seal ring member which may be flipped to provide engagement of said second sealing wear surface with said first ring member.

6. The swivel assembly in accordance with claim 1, wherein said first and said second seal ring members are substantially rectangular in cross-section and said first seal ring member has an annular projection member extending from one side thereof to provide a planar surface for contacting said rotating second seal ring to provide a seal therebetween during non-concentric alignment of said first and said second seal ring members.

7. The swivel assembly in accordance with claim 1, wherein an elastomeric seal member is positioned in said seal chamber between said tubular floating seal member and said washpipe extension portion to prevent escape of the high pressure fluid from the swivel assembly.

8. The swivel assembly in accordance with claim 7, wherein said elastomeric member is selected from a group consisting of an o-ring, a u-cup ring or slipper seal.

9. The swivel assembly in accordance with claim 1, wherein said biasing member is a spring.

10. A washpipe seal assembly for use with a high pressure fluid system, including in combination:
 a non-rotating conduit member having one end attached to the source of high pressure fluid and the other end including a tubular washpipe extension member;
 a tubular floating seal member having a proximal end and a distal end, with said proximal end telescopically mounted about said tubular washpipe extension member to provide a seal chamber therebetween;
 an elastomeric seal member positioned in said seal chamber to prevent escape of the high pressure fluid from the seal assembly;
 a biasing member structurally arranged to engage and mount said tubular floating seal member to said non-rotating conduit member;
 a first seal ring member mounted to said distal end of said tubular floating seal member;
 a rotating conduit member having a proximal end aligned with said distal end of said tubular floating seal member; and
 a second seal ring member structurally secured to said proximal end of said rotating conduit member such that said biasing member provides a sealing force between said first seal ring member and said second seal ring member when high pressure fluid is conducted through the seal assembly.

11. The seal assembly in accordance with claim 10, wherein each of said first and said second ring members is comprised of a ceramic material and is substantially rectangular in cross-section, with at least one of said first or said second ring members having first and second sealing wear surfaces thereon.

12. The seal assembly in accordance with claim 11, wherein each of said first and said second ring members are securely mounted about the external diameter within a steel ring holder member to maintain a symmetrical structure for said wear surfaces while having a flatness for said wear surfaces.

13. The seal assembly in accordance with claim 12, wherein each of said first and said second ring members are mounted within said steel ring holder members by heat shrinking said steel ring holder member about said respective ring member.

14. The seal assembly in accordance with claim 11, wherein at least one of said first or said second ring member is said second seal ring member which may be flipped to provide engagement of said second sealing wear surface with said first ring member.

15. The seal assembly in accordance with claim 10, wherein said first and said second seal ring members are substantially rectangular in cross-section and said first seal ring member has an annular projection member extending from one side thereof to provide a planar surface for contacting said rotating second seal ring to provide a seal therebetween during non-concentric alignment of said first and said second seal ring members.

16. The seal assembly in accordance with claim 10, wherein said elastomeric member is selected from a group consisting of an o-ring, a u-cup ring or slipper seal.

17. The seal assembly in accordance with claim 10, wherein said biasing member is a spring.

18. A swivel assembly for conducting a high pressure fluid, including in combination:
 a non-rotating conduit member having a first end attached to the source of high pressure fluid and having an end opposite said first end,
 a seal guide member structurally secured to said end opposite said first end and aligned with said first end, with said seal guide member having a tubular washpipe extension portion which permits the passage of high pressure fluid therethrough;
 a tubular floating seal member telescopically mounted about said tubular washpipe extension portion and providing a seal chamber therebetween, with said tubular floating seal member, having a distal end, being adjustably secured to said non-rotating conduit member;
 a first seal ring member structurally secured to and aligned with said tubular floating seal member on said distal end thereof;
 a rotating conduit member having a proximal end aligned with respect to said distal end of said tubular floating seal member; and
 a second seal ring member structurally secured to said proximal end of said rotating conduit member, with said first and said second seal ring members being in sealing engagement when a high pressure fluid is conducted through the swivel assembly.

19. The swivel assembly in accordance with claim 18, wherein each of said first and said second ring members is comprised of a ceramic material and is substantially rectangular in cross-section, with at least one of said first or said second ring members having first and second sealing wear surfaces thereon.

20. The swivel assembly in accordance with claim 19, wherein each of said first and said second ring members are securely mounted about the external diameter within a steel ring holder member to maintain a symmetrical structure for said wear surfaces while having a flatness for said wear surfaces.

21. The swivel assembly in accordance with claim 20, wherein each of said first and said second ring members are mounted within said steel ring holder members by heat shrinking said steel ring holder member about said respective ring member.

22. The swivel assembly in accordance with claim 19, wherein at least one of said first or said second ring member is said second seal ring member which may be flipped to provide engagement of said second sealing wear surface with said first ring member.

23. The swivel assembly in accordance with claim 18, wherein said first and said second seal ring members are substantially rectangular in cross-section and said first seal ring member has an annular projection member extending from one side thereof to provide a planar surface for contacting said rotating second seal ring to provide a seal therebetween during non-concentric alignment of said first and said second seal ring members.

24. The swivel assembly in accordance with claim 18, wherein an elastomeric seal member is positioned in said seal chamber between said tubular floating seal member and said washpipe extension portion to prevent escape of the high pressure fluid from the swivel assembly.

* * * * *